United States Patent [19]

Smart

[11] Patent Number: 4,930,712

[45] Date of Patent: Jun. 5, 1990

[54] FILM TAKE-UP SPOOL

[75] Inventor: David C. Smart, Rochester, N.Y.

[73] Assignee: Eastman Kodak Company, Rochester, N.Y.

[21] Appl. No.: 349,477

[22] Filed: May 9, 1989

[51] Int. Cl.$^5$ ............................................. G03B 17/26
[52] U.S. Cl. ................................... 242/74; 242/71.1; 354/275
[58] Field of Search ................. 242/74, 74.1, 71, 71.1, 242/125, 125.1; 354/212, 275

[56] References Cited

U.S. PATENT DOCUMENTS

| | | | |
|---|---|---|---|
| 4,181,271 | 1/1980 | Kluczynski et al. | 242/74 |
| 4,275,855 | 6/1981 | Wakabayashi | 242/74 X |
| 4,303,325 | 12/1981 | Seely | 354/212 |
| 4,398,679 | 8/1983 | Kluczynski et al. | 242/74 |
| 4,411,509 | 10/1983 | Shirai | 354/212 |
| 4,687,311 | 8/1987 | Desormeaux | 354/217 |

Primary Examiner—John Petrakes
Assistant Examiner—Steven M. duBois
Attorney, Agent, or Firm—Roger A. Fields

[57] ABSTRACT

A take-up spool in a camera comprises a cylindrically-shaped major core portion having an outer peripheral surface for supporting a filmstrip, a minor core portion arranged coaxially with respect to the major core portion and having an outer peripheral surface located radially inward of the outer peripheral surface of the major core portion, and a plurality of film catching members projecting from the outer peripheral surface of the minor core portion. A series of film guiding surfaces equal in number to the number of film catching members extend radially between the respective peripheral surfaces of the major and minor core portions. Each of the film guiding surfaces is inclined at substantially the same angle as a tapered leading end of the filmstrip to guide the filmstrip toward one of the film catching members. The film catching members extend radially outward only as far as the outer peripheral surface of the major core portion to enable at least one of the film catching members to support the filmstrip in conformity with that peripheral surface.

4 Claims, 8 Drawing Sheets

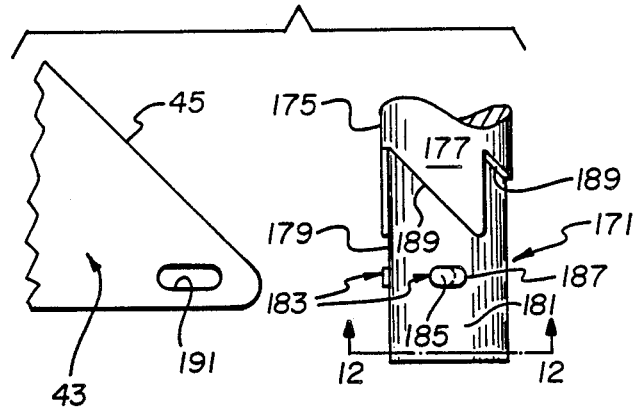
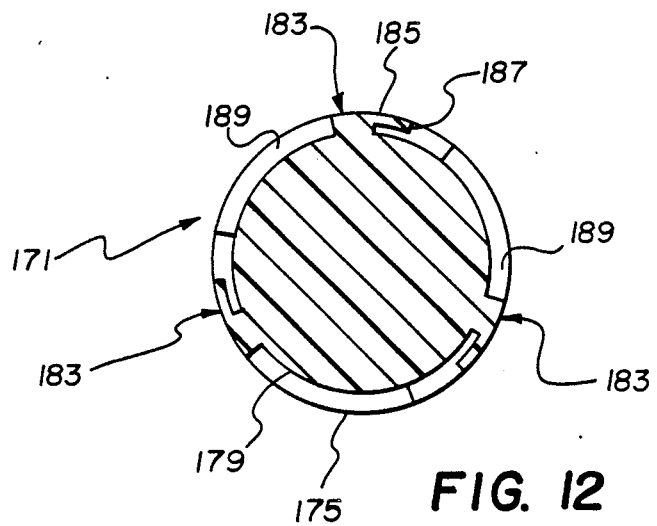

FILM TAKE-UP SPOOL

CROSS-REFERENCE TO RELATED APPLICATION(S)

Reference is made to commonly assigned copending application Ser. No. 221,955 entitled MOTOR-DRIVEN FILM TRANSPORT APPARATUS and filed July 20, 1988 in the name of Donald M. Harvey, now U.S. Pat. No. 4,846,418, issued July 11, 1989.

The cross-referenced application is incorporated by reference in this application.

BACKGROUND OF THE INVENTION

1. Field of the Invention

The invention relates generally to the field of photography, and more particularly to a film take-up spool in a camera.

2. Description of the Prior Art

Numerous film take-up spools have been designed to automatically engage the leader of a 35 mm filmstrip in a camera during the film loading cycle of the camera. For example, commonly assigned U.S. Pat. No. 4,303,325 issued Dec. 1, 1981 discloses a film take-up spool adapted for use with a film leader which has a connecting aperture that includes a flexible tongue element extending forward into the aperture. The take-up spool is provided with several film capturing members evenly spaced about a reduced-diameter portion of the spool core. Each of the capturing members comprises a triangular-shaped head surface, a slanted leading edge surface, and a trailing edge surface having a recess. The slanted leading edge surface engages the film leader at its capturing aperture by entering the aperture during rotation of the take-up spool in a film winding direction, and the triangular-shaped head surface then flexes the tongue element of the aperture sufficiently to allow the head surface to pass through the plane of the film leader. Further rotation of the take-up spool in the same direction allows the tongue element to snap back into the recess in the trailing edge surface to secure the leader to the reduced-diameter core portion. The head surfaces of the capturing members appear to radially extend outward to respective positions radially inward of the film supporting surface of a full-diameter portion of the spool core (see Col. 4, lines 27-33, and FIG. 2 of the patent). This, it is stated, is to prevent the capturing members from contacting the sensitive portions of the film convolutions wound on the supporting surface.

SUMMARY OF THE INVENTION

A take-up spool in a camera comprises a cylindrically-shaped major core portion having an outer peripheral surface for supporting a filmstrip, a minor core portion arranged coaxially with respect to the major core portion and having an outer peripheral surface located radially inward of the outer peripheral surface of the major core portion, and a plurality of film catching members projecting from the outer peripheral surface of the minor core portion. According to the invention, a series of film guiding surfaces equal in number to the number of the film catching members extend radially between the respective peripheral surfaces of the major and minor core portions. Each of the film guiding surfaces is inclined at substantially the same angle as a tapered forward edge of the filmstrip to guide the filmstrip toward one of the film catching members. The film catching members extend radially outward exactly as far as the outer peripheral surface of the major core portion to enable at least one of the film catching members to support the filmstrip in conformity with that peripheral surface.

BRIEF DESCRIPTION OF THE DRAWINGS

FIG. 11 is an elevation view of the take-up spool and the film leader prior to securement of the leader to the spool;

FIG. 12 is a sectional view of the take-up spool as viewed in the direction of the arrows 12,12 in FIG. 11.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
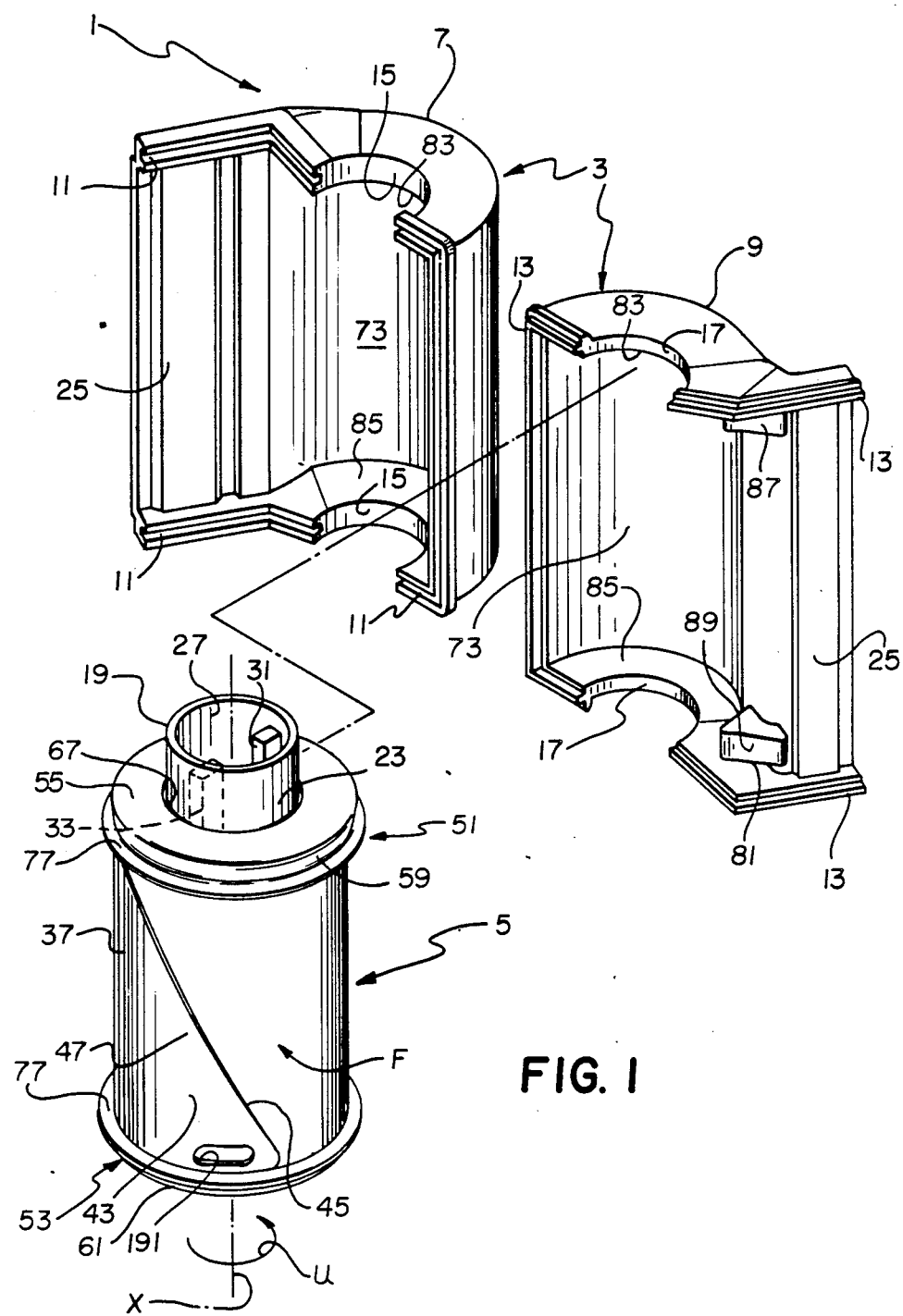
FIG. 1 is an exploded perspective view of a film cassette having a non-protruding film leader as disclosed in the cross-referenced application.
Figure 2:
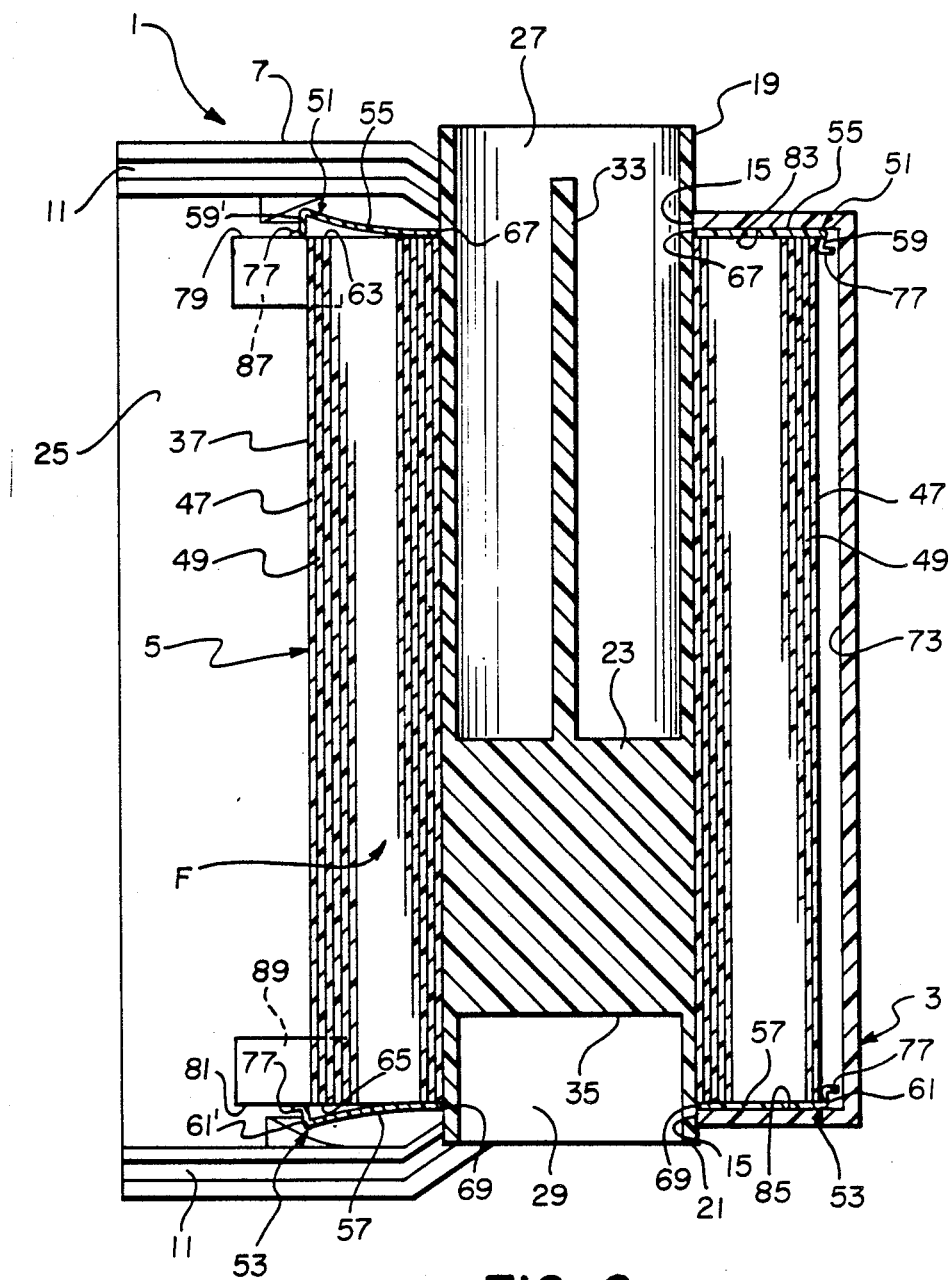
FIG. 2 is an elevation view in cross-section of the film cassette.
Figure 3:
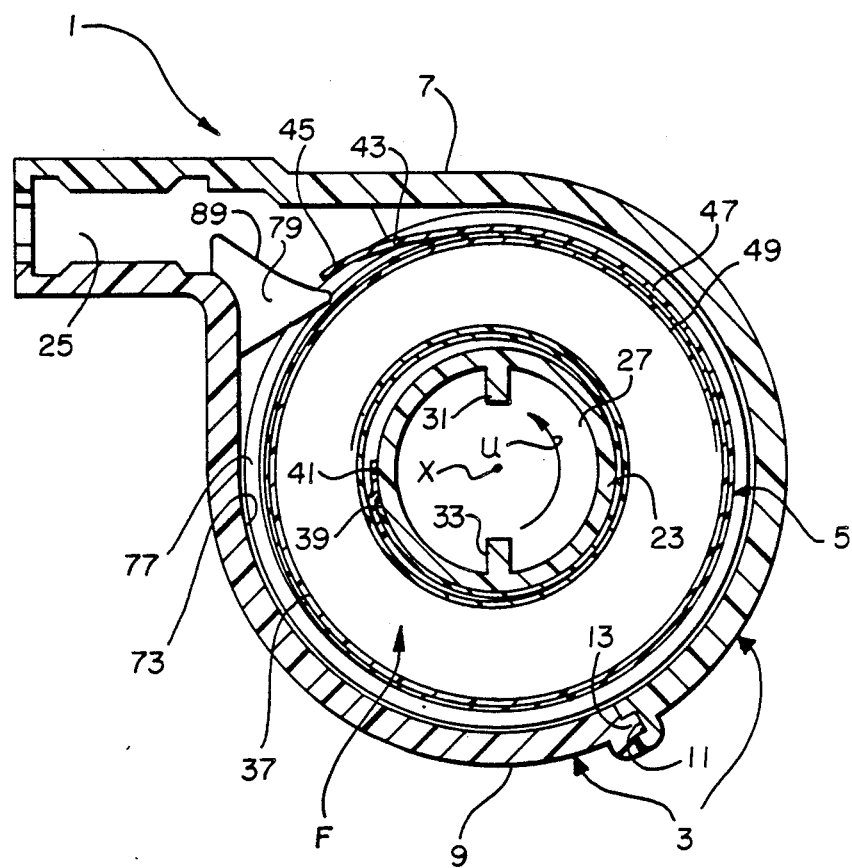
FIG. 3 is an end view in cross-section of the film cassette.

Referring now to the drawings, FIGS. 1-3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a rewinding direction opposite to the unwinding direction.

A film roll 37 comprising a convoluted 35 mm filmstrip F having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a tapered (inclined) leading or forward end 45 and comprises 2-3 convolutions of the film roll 37. One of these leader convolutions is the outermost convolution 47 and another of them is the next inward succeeding convolution 49.

Figure 4:
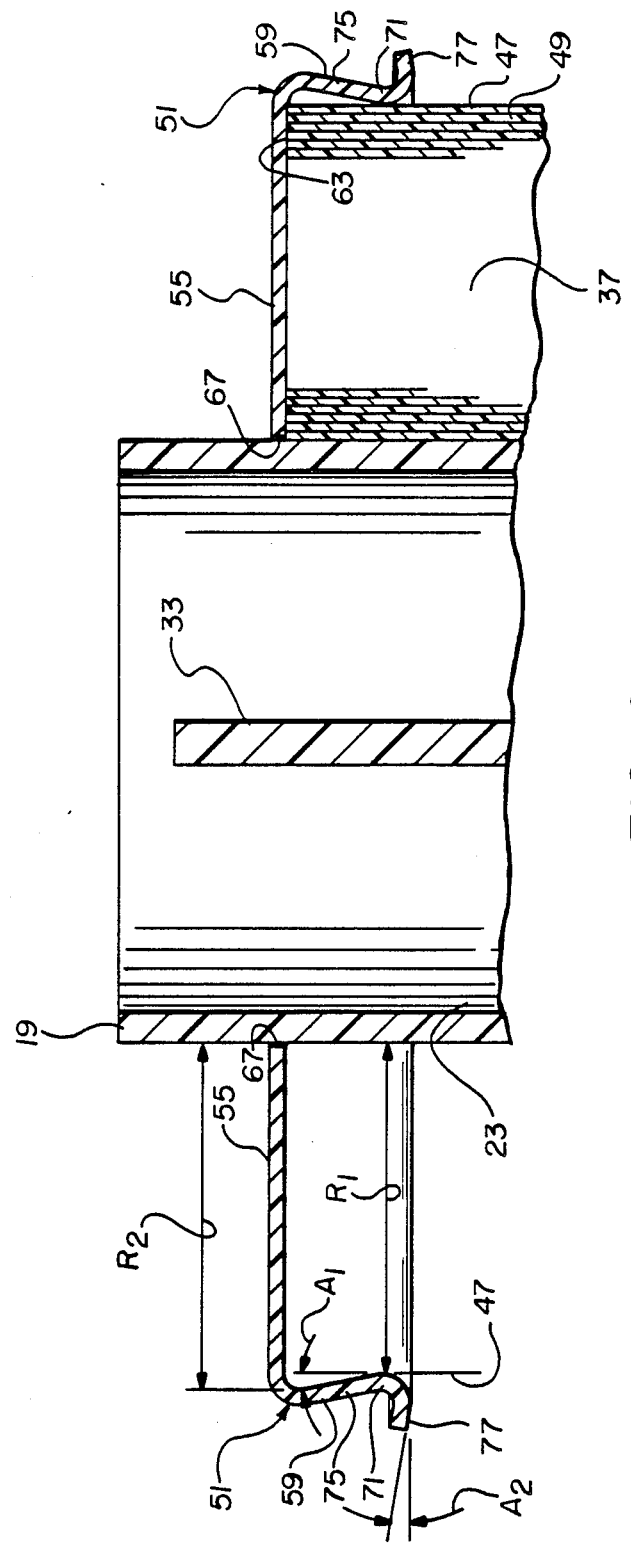
FIG. 4 is an elevation view in cross-section of one of a pair of flanges associated with a film spool located within the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outward from the annular constraining section 71 of one of the lips 59 and 61 and away from the outermost convolution 47.

The annular relief section 75 of each of the lips 59 and 61 is inclined radially inward from one of the disks 55 and 57 toward the outermost convolution 47 to form an acute relief angle $A_1$ with the outer most convolution. See FIG. 4. The relief angle $A_1$ may be 11°45′, for example. The annular constraining section 71 of each of the lips 59 and 61 is curved radially inward with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upward as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inward of the film passage slit 25 as shown in FIG. 2. The respective spreader surfaces 79 and 81 deflect opposite limited portions 59′ and 61′ of the annular lips 59 and 61 axially away from each other to an axial dimension slightly exceeding the film width. See FIG. 2. In essence, the deflected portions 59′ and 61′ of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59′ and 61′ of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59′ and 61′ of the annular lips 59 and 61 axially away from each other as the rspective portions are rotated past the spreader surfaces. The deflected portions 59′ and 61′ of the two lips 59 and 61 are returned to their original non-flexed condition by the semicircular flat surfaces 83 and 85 of the cassette shell 3. As can be appreciated from FIG. 3, the tapered leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the tapered leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction opposite to the unwinding direction U, the filmstrip will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

THE PHOTOGRAPHIC CAMERA

Figure 5:
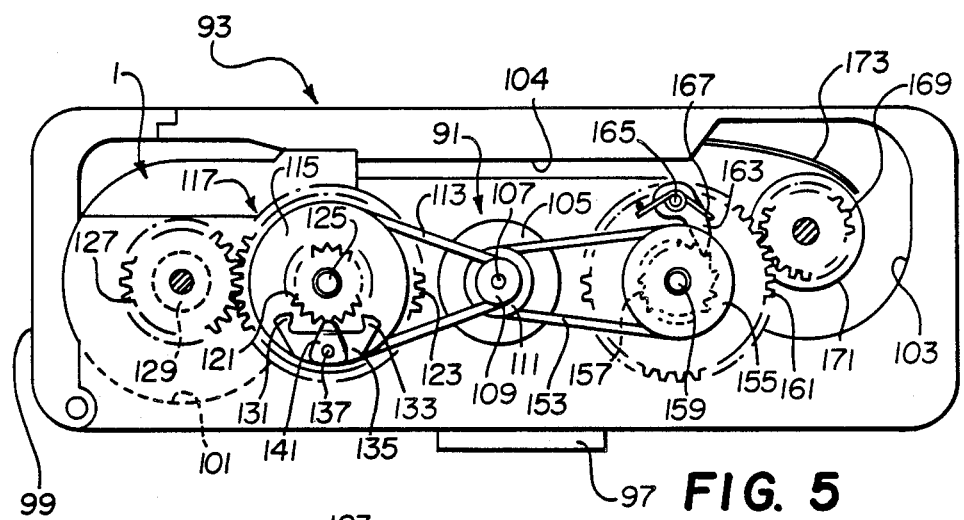
FIG. 5 is a bottom plan view of a motor-driven film transport apparatus in a photographic camera to be used with the film cassette depicted in FIGS. 1-4.
Figure 6:
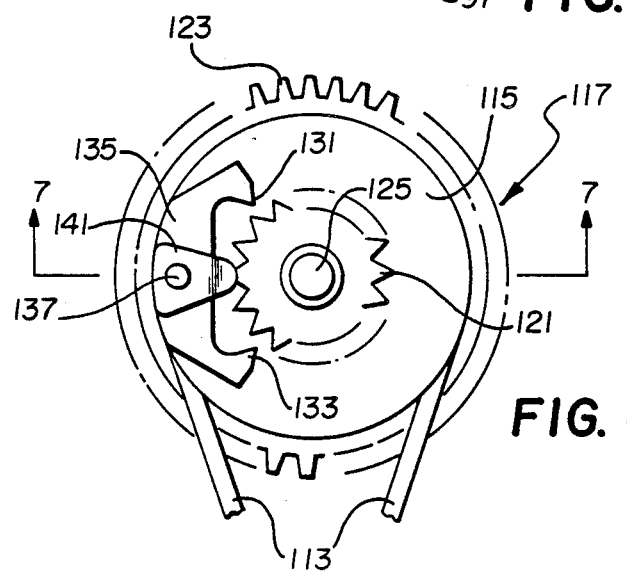
FIG. 6 is a bottom plan view of a bi-directional film drive mechanism of the film transport apparatus.
Figure 7:
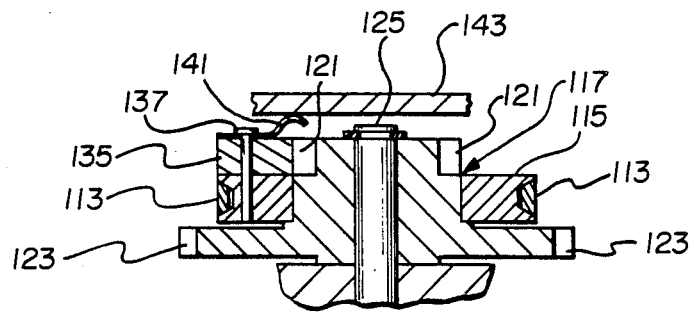
FIG. 7 is a sectional view of the bi-directional film drive mechanism as viewed in the direction of the arrows 7,7 in FIG. 6.
Figure 10:
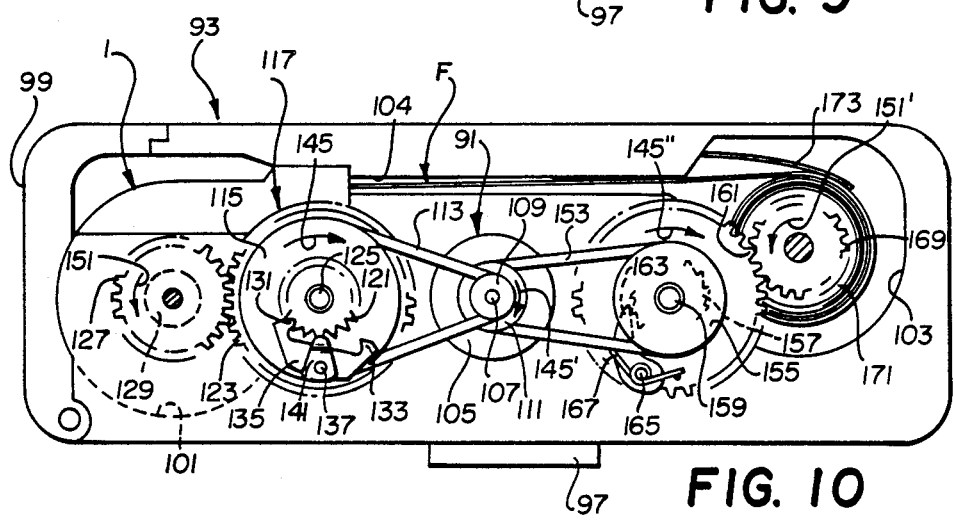
FIG. 10 is a bottom plan view of the film transport apparatus, showing operation of the bi-directional film drive mechanism in a mode for rotating the film spool in a rewinding direction.

Referring now to FIGS. 5-7, a motor-driven film transport apparatus 91 for a photographic camera 93 is depicted for use with the film cassette 1. The camera body 95 is shown with a front lens shield 97, a side door 99 opening to a cassette-receiving chamber 101, a separate film take-up chamber 103, and a film guide channel 104 interconnecting the two chambers. A single bi-directional drive motor 105 which can change its rotational direction by, for example, switching the current flow direction to the motor, includes a drive shaft 107. A pair of smaller and larger drive pulleys 109 and 111 are coaxially fixed to the drive shaft 107. The smaller drive pulley 109 is drivingly connected via an endless belt 113 to a driven pulley 115, concentrically disposed loosely about a multiple gear unit 117. The multiple gear unit 117 has a smaller circular gear portion 121 and a larger circular gear portion 123, and is mounted for rotation on an idler shaft 125. The larger circular gear portion 123 of the multiple gear unit 117 is arranged to continually engage a gear wheel 127 having an integral coaxial rotation hub 129 which projects from the bottom of the cassette-receiving chamber 101 to engage the two keying ribs 31 and 33 formed with the spool core 23 of the film cassette 1. The smaller circular gear portion 121 of the multiple gear unit 117 is intended to be drivingly engaged by either one of a pair of separate pawl ends 131 and 133 of a bi-directional drive member 135. The drive member 135 is mounted atop the driven pulley 115 via a pivot pin 137, disposed parallel to the idler shaft 125. When the multiple gear unit 117 is rotated in a counter-clockwise direction 139 about the idler shaft 125 as viewed in FIG. 8, a thin leaf spring 141 fixed to the drive member 135 at the pivot pin 137 will drag along a plate-like section 143 of the camera body 95 to swing the drive member about the pivot pin until its pawl end 133 drivingly engages the smaller circular gear portion 121 of the multiple gear unit. See FIGS. 7 and 8. Conversely, when the multiple gear unit 117 is rotated in a clockwise direction 145 about the idler shaft 125 as viewed in FIG. 10, the leaf spring 141 will drag along the plate-like section 143 to swing the drive member 135 about the pivot pin 137 until its pawl end 131 drivingly engages the smaller circular gear portion 121 of the multiple gear unit. Thus, energization of the drive motor 105 with a current flow direction to rotate the smaller drive pulley 109 in a counter-clockwise direction 139' as viewed in FIG. 8, will swing the drive member 135 to position its pawl end 133 in driving engagement with the smaller circular gear portion 121 to in turn rotate the larger circular gear portion 123 in the counter-clockwise direction 139, and thereby will rotate the gear wheel 127 in a clockwise direction 147 to in turn rotate the spool core 23 of the the film cassette 1 in the unwinding direction U to thrust the non-protruding film leader 43 from the film cassette (as described in detail above) into the film guide channel 104. Energization of the drive motor 105 with a current flow direction to rotate the smaller drive pulley 109 in a clockwise direction 145' as viewed in FIG. 10, will swing the drive member 135 to position its pawl end 131 in driving engagement with the smaller circular gear portion 121 to in turn rotate the larger circular gear portion 123 in the clockwise direction 145, and thereby will rotate the gear wheel 127 in a counter-clockwise direction 151 to in turn rotate the spool core 23 of the film cassette 1 in the rewinding direction opposite to the unwinding direction U to return the film leader 43 to the film cassette.

The larger drive pulley 111 is drivingly connected via an endless belt 153 to a driven pulley 155 which, with an integral circular gear portion 157, is mounted for rotation on an idler shaft 159. A gear wheel 161 is concentrically disposed loosely about the idler shaft 159, and is normally coupled to the pulley gear portion 157 by a pawl member 163 for concurrent rotation with the driven pulley 155 in the counter-clockwise direction 139" as viewed in FIG. 8. The pawl member 163 is mounted atop the gear wheel 161 via a pivot pin 165, disposed parallel to the idler shaft 159, and is urged by a torque spring 167 to releasably engage the pulley gear portion 157. The gear wheel 161 continually engages a gear wheel 169 which is coaxially fixed to a rotatably mounted novel take-up spool 171 or drum (to be described below) in the take-up chamber 103. When the drive motor 105 is energized with a current flow direction to rotate the larger drive pulley 111 in the counter-clockwise direction 139' as viewed in FIG. 8, the pulley gear portion 157 will be rotated in the counter-clockwise direction 139" to orbit the pawl member 163 in the same direction to in turn similarly rotate the gear wheel 161, and thereby rotate the gear wheel 169 in a clockwise direction 147' to similarly rotate the take-up spool 171. Due to the gear and pulley ratios, the pulley gear portion 157 will be rotated at a sufficient speed which ensures that the take-up spool 171 will take-up the film leader 43 faster than the spool core 23 of the film cassette 1 can be rotated to thrust the film leader from the film cassette. As a result, the film pull or tension exerted at the spool core 23 of the film cassette 1, because of take up of the film leader 43 at the take-up spool 171, will cause the smaller circular gear portion 121 of the multiple gear unit 117 to be overdriven in the counter-clockwise direction 139; whereupon, the smaller circular gear portion will disengage from the pawl end 133 of the bi-directional drive member 135 as shown in FIG. 9 to, in effect, uncouple the drive motor 105 from the spool core. When the drive motor 105 is energized with a current flow direction to rotate the larger drive pulley 111 in the clockwise direction 145' as viewed in FIG. 10, the pulley gear portion 157 will be rotated in the clockwise direction 145". However, the pulley gear portion 157 will not orbit the pawl member 163 as in the previous instance, because of the inclination of the gear teeth. See FIG. 10. As a result, the pawl member 163 cannot serve to rotate the gear wheel 161. Moreover, the take-up spool 171 will only be rotated in a counter-clockwise direction 151', because of the film pull exerted at the take-up spool as the filmstrip F is rewound onto the spool core 23 of the film cassette 1.

Figure 8:
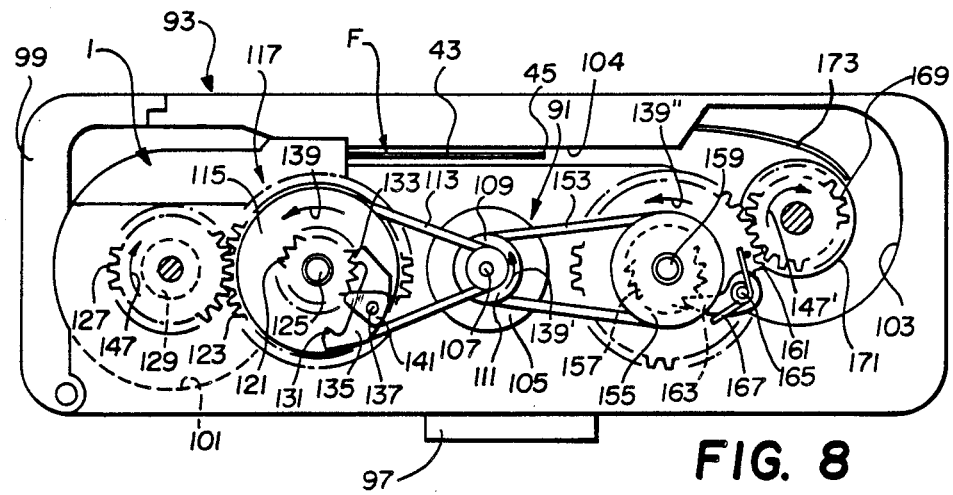
FIGS. 8 and 9 are bottom plan views of the film transport apparatus, showing operation of the bi-directional film drive mechanism in respective modes for rotating the film spool of the film cassette in an unwinding direction and for allowing the spool to be film-driven when the film leader is secured to a novel take-up spool.
Figure 9:
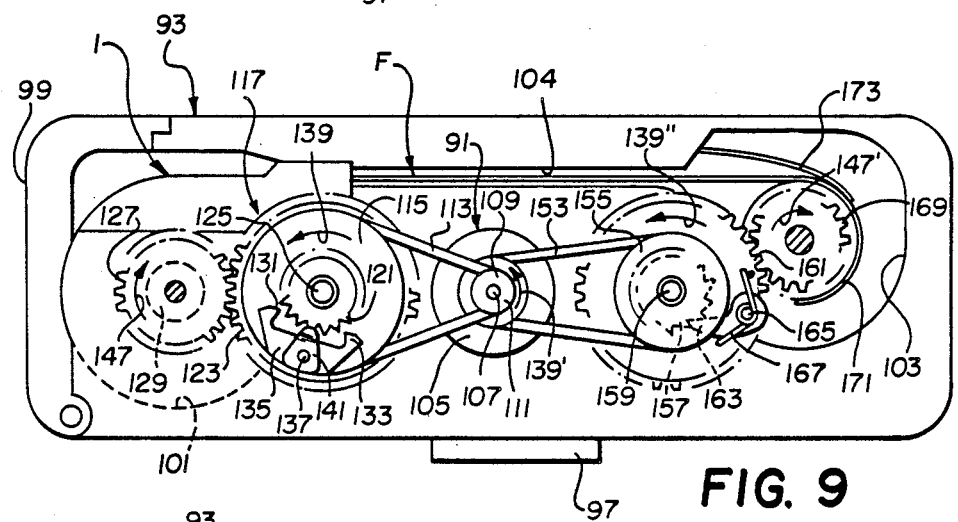

It will not be appreciated that the bi-directional drive member 135 has respective positions, shown in FIGS. 8 and 10, for effecting alternate one-way driving connections with the spool core 23 of the film cassette 1 to rotate the spool core in the unwinding and rewinding directions in accordance with the rotational direction of the drive motor 105. During advance of the film leader 43 from the film cassette 1 to the take-up spool 171, the take-up spool is motor-driven at a faster speed than the spool core 23 of the film cassette 1 is rotated. A spring-like guide arm 173, shown in FIG. 8, serves to direct the tapered leading end 45 of the film leader 43 toward the take-up spool 171. When the film leader 43 is wound on the take-up spool 171, the drive member 135 permits the spool core 23 of the film cassette 1 to be overdriven by the resulting pull of the filmstrip F exerted at the spool core. During rewinding of the filmstrip F on the spool core 23 of the film cassette 1, the take-up spool 171 is uncoupled from the drive motor 105 to allow the spool core to serve as the only means for film movement.

According to the invention, the take-up spool 171 as shown in FIGS. 11 and 12 comprises a cylindrically-shaped major (full-diameter) core portion 175 having an outer peripheral surface 177 for supporting the filmstrip F, a similarly shaped minor (reduced-diameter) core portion 179 arranged coaxially with respect to the major core portion and having an outer peripheral surface 181 located radially inward of the outer peripheral surface of the major core portion. Three identical film catching hooks 183 project in evenly spaced relation from the outer peripheral surface 181 of the minor core portion 179. The film catching hooks 183 each have an arcuate film supporting surface 185 which precisely follows the curvature of the outer peripheral surface 177 of the major core portion 175 to support the filmstrip F in radial alignment with that peripheral surface, and which terminates at a film catching free edge 187 spaced radially outward from the outer peripheral surface 181 of the minor core portion only as far as the outer peripheral surface as the major core portion. A series of film guiding surfaces 189 extend radially between the outer peripheral surface 177 of the major core portion 175 and the outer peripheral surface 181 of the minor core portion 179 to bridge the two peripheral surfaces. The film guiding surfaces 189 are equal in number to the number, i.e. three, of the film catching hooks 183, and each one of them is inclined at substantially the same angle as the tapered leading end 45 of the film leader 43 to guide the film leader to one of the hooks.

Figure 13A:
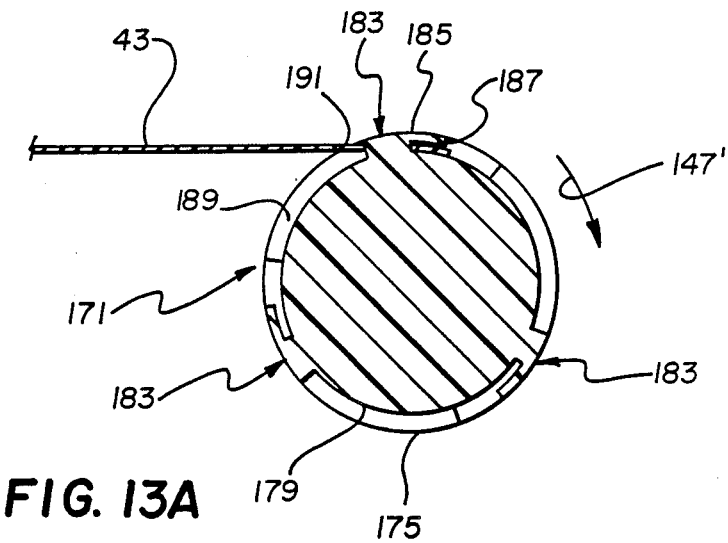
FIGS. 13A and 13B are sectional views of the take-up spool and the film leader, showing the manner in which the leader is secured to and wound onto the spool.
Figure 13B:
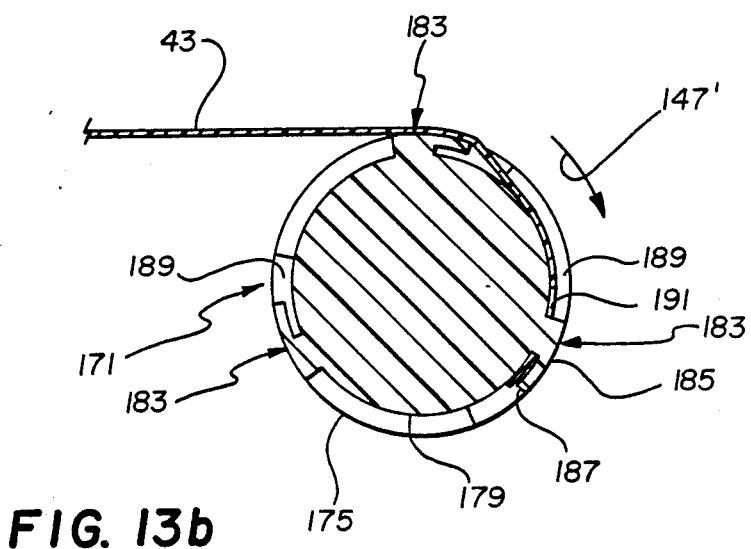

When the take-up spool 171 is rotated in the clockwise direction 147' as viewed in FIGS. 13A and 13B, one of the film guiding surfaces 189 contacts the tapered leading end 45 of the film leader 43 to guide a slot 191 in the film leader to the film catching edge 187 of one of the hooks 183, enabling the hook to enter the slot and thereby engage the film leader. See FIG. 13A. Then, continued rotation of the take-up spool 171 in the same direction 147' advances the film supporting surfaces 185 of the next-succeeding hooks 183 successively beneath the film leader 43 to support the film leader in radial alignment with the outer peripheral surface 177 of the major core portion 175. See FIG. 13B. Thus, the film leader 43 can be wound onto the major core portion 179.

The invention has been described with reference to a preferred embodiment. However, it will be appreciated that variations and modifications can be effected with the ordinary skill in the art without departing from the scope of the invention.

I claim:

1. A take-up spool for winding elastic material in the form of a filmstrip comprising a cylindrically-shaped major core portion having an outer peripheral surface for supporting the filmstrip, a minor core portion arranged coaxially with respect to said major core portion and having an outer peripheral surface located radially inward of said outer peripheral surface of the major core portion, and a plurality of film catching members projecting from the outer peripheral surface of said minor core portion, characterized in that:

a series of film guiding surfaces equal in number to the number of said film catching members extend radially between the outer peripheral surface of said major core portion and the outer peripheral surface of said minor core portion, each of said film guiding surfaces being inclined at substantially the same angle as a tapered leading end of the filmstrip to guide the filmstrip toward one of said film catching members.

2. A take-up spool as recited in claim 1, wherein said film catching members each extend radially outward from said minor core portion exactly as far as the outer peripheral surface of said major portion to enable at least one of the film catching members to support the filmstrip in conformity with that peripheral surface.

3. A take-up spool as recited in claim 1, wherein said film catching members each have an arcuate film supporting surface which precisely follows the curvature of the outer peripheral surface of said major core portion.

4. A take-up spool as recited in claim 3, wherein said film supporting surface has a film catching edge spaced radially outward from said minor core portion only as far as the outer peripheral surface of said major core portion.

* * * * *